United States Patent [19]

Fillios

[11] 4,133,571
[45] Jan. 9, 1979

[54] EXPANDABLE CAMPER BODY

[76] Inventor: Frank T. Fillios, 53 Hillside Ter., Belmont, Mass. 02178

[21] Appl. No.: 766,832

[22] Filed: Feb. 7, 1977

[51] Int. Cl.² .............................................. B60P 3/32
[52] U.S. Cl. ...................................... 296/23 C; 52/67; 296/26
[58] Field of Search .......................... 296/23 C, 26, 27; 52/67; 135/1 R, 1 A

[56] References Cited

U.S. PATENT DOCUMENTS 3,181,910  5/1965  Thomas ...................................... 52/67
3,212,810  10/1965  Bass ...................................... 296/23 C

FOREIGN PATENT DOCUMENTS 2026360  12/1971  Fed. Rep. of Germany ........ 296/23 C
237899  12/1943  Switzerland .............................. 296/26

Primary Examiner—Joseph F. Peters, Jr.
Assistant Examiner—John A. Carroll
Attorney, Agent, or Firm—James J. Cannon, Jr.

[57] ABSTRACT

An expandable camper body having an aft section which telescopes within a forward section, folding support tracks for guiding and supporting the aft section when extended, said support tracks providing an extension of tracks within the forward section, hydraulic power for raising and lowering said support tracks and powered gear drive to extend and retract said aft section on said tracks. Flexible utility connections are provided such that all utilities are operative in the extended or retracted positions.

3 Claims, 11 Drawing Figures

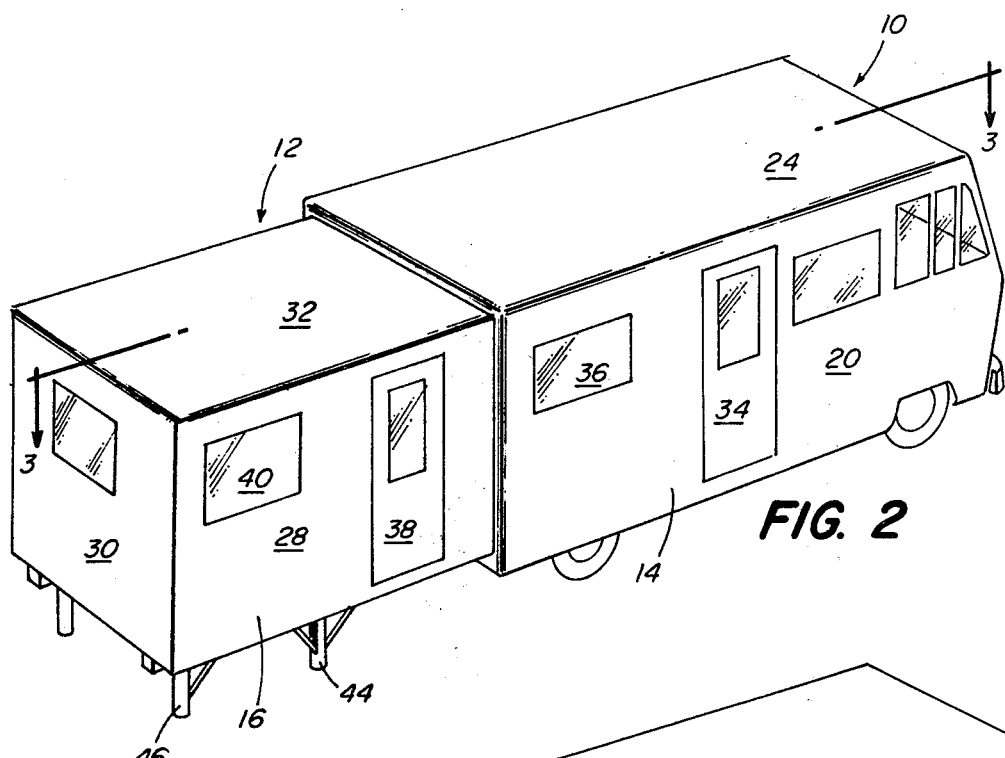
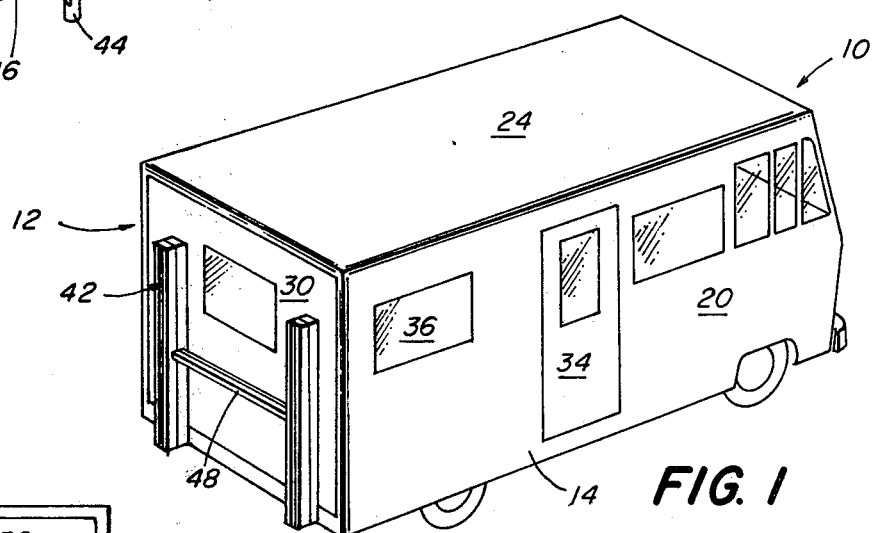
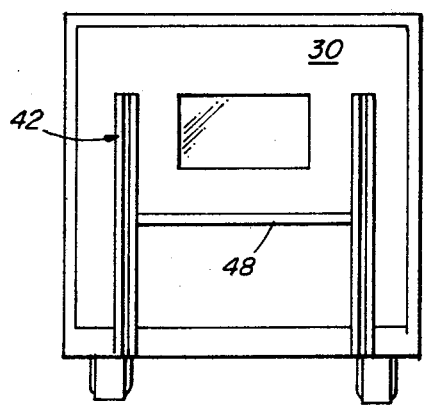
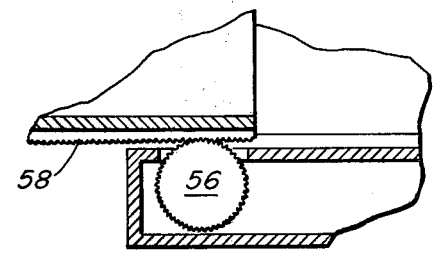
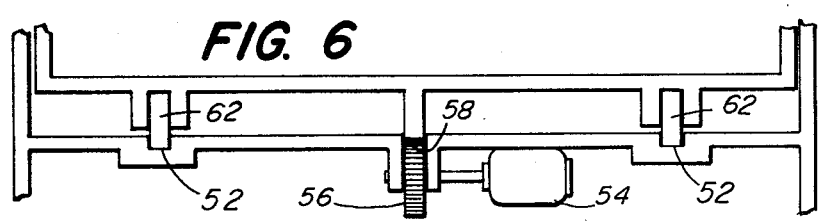

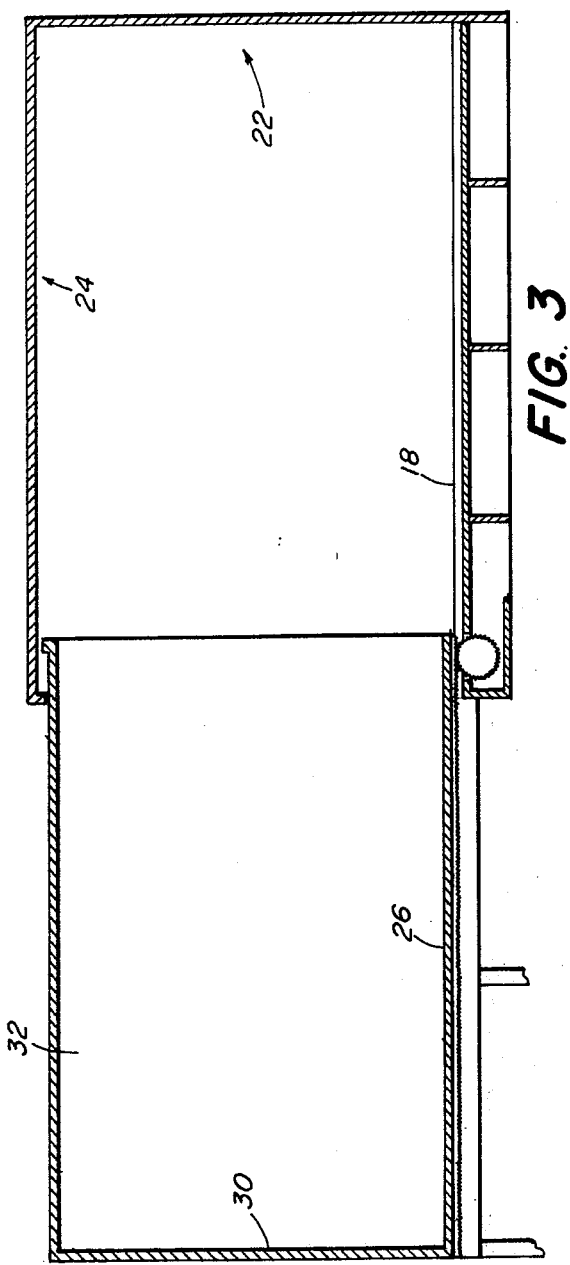
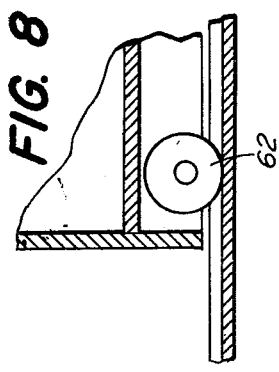
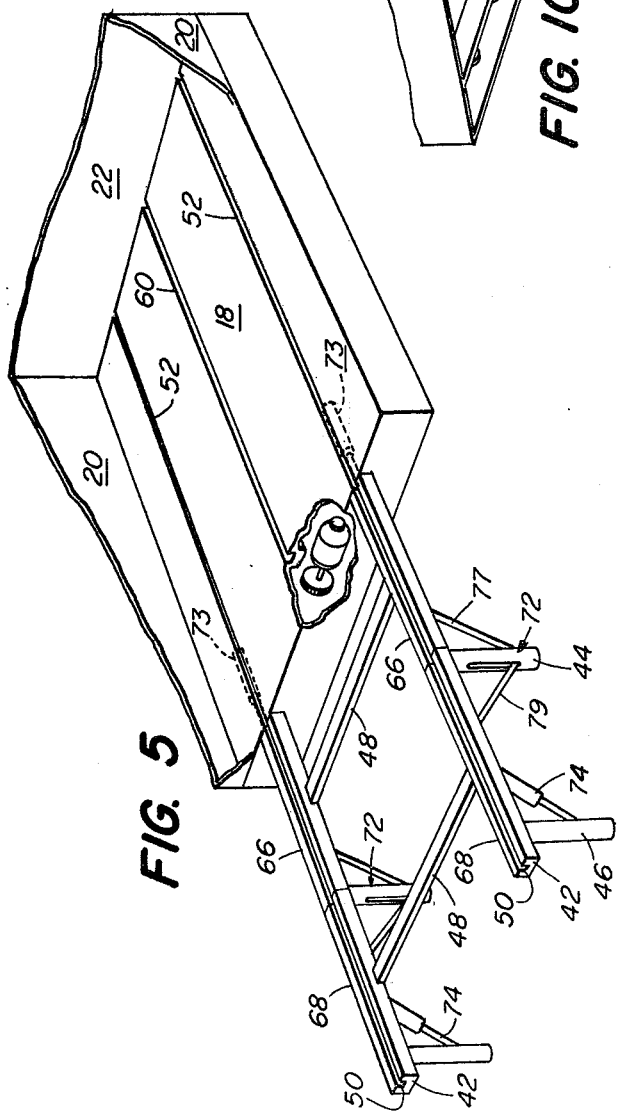
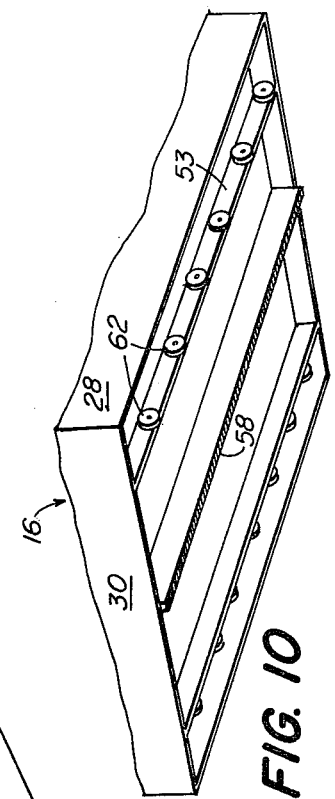

EXPANDABLE CAMPER BODY

BACKGROUND OF THE INVENTION

1. Field of the Invention

This invention pertains to expandable camper bodies, and in particular to a camper body composed of forward and aft sections, the aft section capable of a telescoping movement within the forward section and the support tracks for the aft section capable of being raised and folded hydraulically for ease of transport.

2. Description of the Prior Art

The prior patent art is replete with examples of expandable camper bodies and house trailers. However, to the best of the inventor's knowledge, none of the prior art devices has been a commercial success. An analysis of the prior art indicates that the basic problems relate to the cost effectiveness of the prior art designs. Most are too expensive to manufacture, too difficult to operate and provide too little additional space relative to the additional costs. For example, in U.S. Pat. No. 3,212,810, a collapsible house trailer is described which collapses both vertically and horizontally. The provision of vertical expansion adds a little to the value of the trailer, but a substantial amount to the cost of production. The longitudinal expansion of this trailer results in a separation of its front and rear wheels, which bear the load of its weight. To offset the change in weight and balance distribution, a strong expandable undercarriage or structural frame must be provided, though details are not shown. Furthermore, the provision of vertical and horizontal expansion creates, in the fully collapsed state, a situation in which three walls overlap on portions of each side of the trailer, thereby costing a substantial loss of useful space relative to the gross space. U.S. Pat. Nos. 2,902,312 and 2,732,251 each teach horizontally, latitudinally, expandable house trailers. The first patent requires jacks under both fixed and movable sections for support, and requires a complicated folding floor mechanism. The second also has a folding floor which interferes with use of the trailer in the collapsed position. Furthermore, U.S. Pat. No. 2,732,251 requires an extensive and intricate hydraulic system for its operation. It is clear that the trailer of this invention is too expensive to be practical. Among the recent patent art, U.S. Pat. No. 3,740,088 illustrates telescopic end sections for a trailer. This is a typical example of a non-cost-effective design, in that the additional bunk space provided does not justify the addtional cost of fabrication, U.S. Pat. No. 3,915,492 teaches a trailer that is expandable horizontally either along its latitudinal axis or along its longitudinal axis. The embodiments taught in this patent are mechanically complex and somewhat incomplete. It is unclear how the roof extends to cover the extended areas, how the utility lines are handled and how the extended areas are supported. Furthermore, a considerable amount of weight is added to the trailer and considerable internal height is lost with its double flooring arrangement.

The expandable camper body of the present invention is specifically designed to overcome the limitations of prior art designs by providing mechanical simplicity with sturctural integrity in an inexpensive, cost-effective embodiment. The present invention does not utilize vertical expansion because the additional structural requirements are not worth the minimal additional useful space. Horizontal expansion along the latitudinal axis presents its own problems. If both sides expand outwardly, some mechanical systems must be duplicated. If one side expands only, problems of tracking and weight and balance arise. Hence, the present invention is designed for horizontal expansion along the longitudinal axis of the camper body. This embodiment lends itself to simple mechanical systems and minimal operational problems.

This invention relates to camper bodies, and is directed particularly to a camper body which, when expanded, approximately doubles in size. The principal object of this invention is to provide a camper body which, when retracted, is relatively small and easy to transport and can be compacted to approximately one half its extended volume to provide the least visual obstruction and wind resistance in transport from place to place.

A more particular object of the invention is to provide a camper body which comprises a telescoping aft section so arranged as to permit simplified, inexpensive construction and ease of expansion when parked.

Another object is to provide improved and simplified track means interconnecting the forward and aft sections of the camper body for relatively simple horizontal movement in expanding and retracting the camper body such that the expansion and retraction may be performed by one person in a short period of time.

Another object of the invention is to provide an expandable camper body which automatically secures the forward and aft sections in tight interfitting engagement at the fully extended and fully retracted positions for structural integrity.

Another object of this invention is to provide a novel means for guiding the movable aft section of the camper body and a power driven means for effecting such movement, so that virtually no manual labor is required to expand or retract that section, and so that the expansion and retraction may be effected with minimum effort and a few minutes time.

Another object of this invention is to provide an improved hydraulic fluid pressure system for operating the expansion and retraction of the aft section of an expandable camper body.

SUMMARY OF THE INVENTION

The present invention relates to an expandable camper body which may be mounted on the chassis of a truck, preferably a delivery type van. The expandable camper body includes a forward, fixed section mounted on the truck chassis, and an aft section which snugly telescopes within the forward section in the retracted position and telescopes rearwardly along the longitudinal axis in the expanded position. Each section comprises a floor, three side walls, and a roof, there being no common side wall between the two sections. Since the aft section fits completely within the forward section and extends all the way to its front wall, expansion of the aft section substantially doubles the interior of the camper body. For mechanical simplicity and structural integrity, the expanded aft section is supported by a pair of hydraulically operated, folding support tracks. When the aft section is fully telescoped within the forward section, these support tracks are fully folded and stored vertically against the rear wall of the aft section. When the aft section is to be expanded rearward, these support tracks are unfolded hydraulically and lowered to a horizontal position such that they are aligned longitudinally with corresponding tracks in the floor of the forward section. As the support tracks are lowered, two pairs of spaced apart legs are unfolded downwardly to provide vertical support for the tracks, one supporting each section of track. These support tracks in effect are extensions of the truck chassis frame and serve the dual purpose of guiding the aft section as it moves rearward and supporting it during and after its extension, thus eliminating the need for auxiliary jacks. The aft section is able to move inwardly and outwardly by means of small wheels mounted on the underside of its floor which ride along the support tracks and corresponding tracks in the floor of the forward section. These tracks are spaced toward either side wall substantially above and parallel to the chassis frame. When the aft section is expanded rearward, covers are placed over the tracks of the forward section to provide a level floor in the forward section. The means for effecting movement of the aft section inwardly and outwardly is provided by a centrally disposed, longitudinally oriented gear rack in the underside of the aft section. A corresponding open track in the floor of the forward section receives this gear rack as the aft section is telescoped within the forward section. A motor driven spur gear mounted at the rear end of the truck chassis and just under the floor of the forward section meshes with this gear rack to effect the forward and rearward movement of the aft section. When the aft section is fully extended, a cover is placed over the centrally disposed receiving track to provide a level floor in the forward section. When not in use these covers are stored in the floor in the aft section. Utility lines for gas, water and electricity run along the base of the sidewalls of the forward and aft sections. Quick release connections are provided between the forward and aft section lines such that when the aft section is retracted, its utility lines may be connected to the front end of the forward section and when the aft section is extended, its utility lines are connected to the rear end of the forward section. Whether the aft section is extended or retracted, the camper body is able to be used for living purposes. All controls for operating the extension and retraction of the aft section are mounted on the rear of the camper body so that the operator may view its operation, a distinct safety feature.

BRIEF DESCRIPTION OF THE DRAWINGS

FIG. 1 is a side perspective view of the camper body of the present invention mounted on a van chassis, with the aft section retracted within the forward section.

FIG. 2 is a side perspective view of the camper body of FIG. 1 with the aft section fully extended.

FIG. 3 is a sectional view of the camper body taken along the line 3—3 of FIG. 2.

FIG. 4 is a rear view with the support tracks fully folded.

FIG. 5 is a partially cut-away rear view with the support tracks fully extended and in position to receive the aft section.

FIG. 6 is a cut-away view of the rear of the forward section showing the track system of the forward section.

FIG. 7 is a view of the gear rack on the underside of the aft section meshed with the driving spur gear.

FIG. 8 is a detail view of an aft section wheel.

FIG. 10 is a cut-away view of the underside of the aft section of the camper body.

DESCRIPTION OF THE PREFERRED EMBODIMENT

Figure 9:
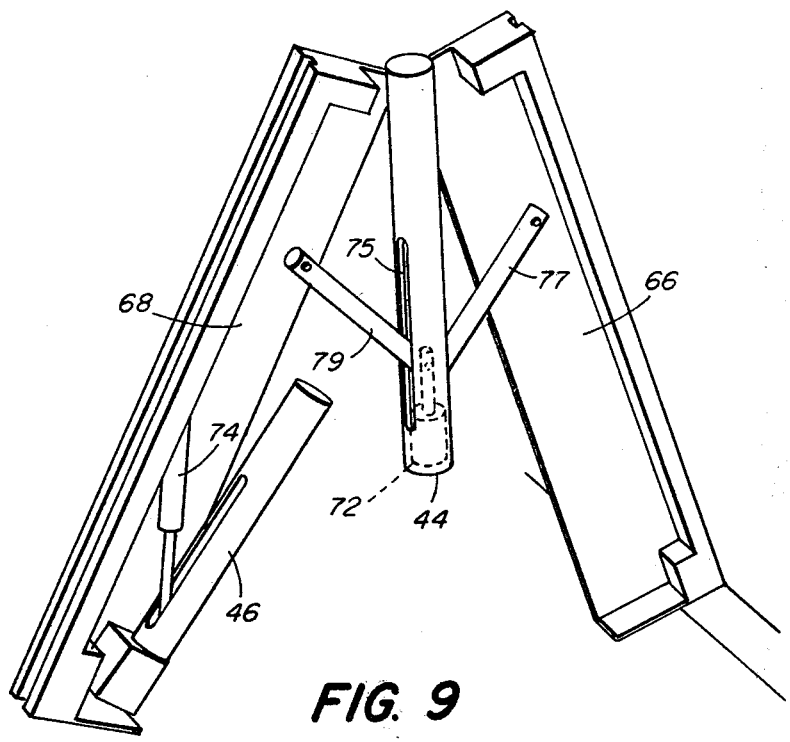
FIG. 9 is a detailed view of the support track hydraulic system.

Referring now to the drawings, FIG. 1 is a side perspective view of a delivery van 10 having mounted thereon the expandable camper body 12 of the present invention in its fully retracted position, and FIG. 2 is a similar view with expandable camper body 12 fully extended. Expandable camper body 12 comprises a forward section 14 mounted on the chassis of van 10 and an aft section 16 which is capable of retraction within forward section 14 and extension outward therefrom. Forward section 14 has a floor 18, sidewalls 20, front wall 22 and roof 24. Aft section 16 has a floor 26, sidewalls 28, rear wall 30 and a roof 32. FIGS. 1, 2 and 3 illustrate the relative positions of these walls, floors and roofs. Allowing for the fact that aft section 16 can be fully telescoped within forward section 14, aft section 16 has slightly smaller dimensions than forward section 14. When aft section 16 is fully extended, the floor space and volume of camper body 12 are nearly doubled. Both sidewall 20 of forward section 14 and sidewall 28 of aft section 16 have at least one door 34, 38 respectively and at least one window 36, 40 respectively. Doors 34, 38 and windows 36, 40 are so positioned that they coincide when aft section 16 is fully retracted within forward section 14. Both aft section 16 and forward section 14 are so constructed that camper body 12 is usable whether in a fully retracted position or a fully extended position.

Aft section 16 is guided to and supported in its fully extended position by support tracks 42, the details of which are illustrated in FIGS. 4 through 9. FIG. 4 illustrates the support tracks 42 fully folded and secured in a storage and travel position on the exterior rear wall 30 of aft section 16 which is fully retracted within forward section 14. FIG. 5 illustrates support tracks 42 in a fully extended horizontal position. In order to be folded, support tracks 42 are divided into two hinged sections, as will be described hereinafter in reference to FIG. 9. Support tracks 42 are hinged to van chassis 10 and, in effect, form an extension of the chassis frame to support the weight of aft section 16 when extended. Each support track 42 includes a pair of spaced legs 44, 46, one under each half of support track 42. Legs 4, 46 fold downward to a vertical position, as described hereinafter in reference to FIG. 9, and are adjustable to compensate for variations in ground level in order to maintain support tracks 42 in a level, horizontal position. A pair of brace rods 48 are placed between support tracks 42 to maintain proper longitudinal alignment with van chassis 10.

Referring now to FIG. 5, support tracks 42 also provide guide means for supporting aft section 16 for in and out telescoping motion with respect to forward section 14. To this end, support tracks 42 have longitudinally extending rectangular recesses forming depressed tracks 50 and the floor 18 of forward section 14 has longitudinally extending rectangular recesses forming depressed tracks 52, spaced substantially along the lines of the chassis frame of van 10 and aligned with tracks 50. The underside of aft section 16 (FIG. 10) has similar but complementary track members 53 in register with and complemental to the recesses of forward section 14. A plurality of wheels 62 are journaled in spaced relation within and along upper recesses 53, which wheels sit in depressed tracks 50, 52, thereby providing vertical support for aft section 16 when retracted and at the same time permitting smooth in and out or telescoping movement of aft section 16 relative to forward section 14.

The actual propulsion means comprises a motor 54 driving a spur gear 56, both mounted at the rear of van chassis 10 (FIGS. 5 and 6), the spur gear 56 engaging a gear rack 58 centrally located along the longitudinal axis of the underside of aft section 16 (FIGS. 6, 7 and 10). A corresponding receiving track 60 is located in the floor 18 of forward section 14 to receive gear rack 58. Motor 54 may be driven by the battery of van 10 or by an external power source. When aft section 16 is fully extended, covers (not shown) are placed over tracks 52, 60 to provide a flush floor 18 in forward section 14. When aft section 16 is to be retracted, the covers are stored in floor 26 of aft section 16.

FIG. 5 also illustrates double acting hydraulic cylinders 72, 73 and 74, described in reference to FIG. 9.

FIG. 6 is a sectional view of the rear of forward section 14 showing aft section 16 fully retracted, the wheels 62 of aft section 16 in depressed tracks 52, spur gear 56 and its motor 54.

FIG. 7 is a cut-away view illustrating the engagement of spur gear 56 with gear rack 58.

FIG. 8 is a cut-away view showing a wheel 62 in a depressed track 50, 52, for movement of aft section 16.

FIGS. 5 and 9 illustrate the simple hydraulic system which serves to extend and retract support tracks 42 and their vertical legs 44, 46. This system, actuated by controls (not shown) located on rear wall 30 of aft section 16, causes support tracks 42 to extend and retract with a minimal number of double acting hydraulic cylinders. In normal travel position, support tracks 42 are stored as shown in FIG. 4. In the normal lowered position, support tracks are extended as shown in FIG. 5. Each track 42 is constructed in two hinged sections, 66, 68.

Hydraulic means are provided for folding and unfolding support tracks 42, as well as for raising and lowering their legs 44, 46. To this end a pair of double acting hydraulic cylinders 73 are fitted longitudinally under forward section 14, the actuating piston thereof being connected in any suitable manner to the van chassis 10. To permit the lowering and unfolding of track support 42 from the raised position of FIG. 4, dual acting hydraulic cylinder 73 mounted on the rear of van chassis 10 pushes track section 66 away from rear wall 30. At the same time a second dual acting hydraulic cylinder 72 vertically installed at the base of opening 75 in leg 44 pushes ends of slidably mounted diagonal brace members 77, 79 also folded into opening 75 upwards. The other ends of braces 77, 79 are pivotally secured to track sections 66, 68. As braces 77, 79 are pushed upward, hinged track sections 66, 68 are pushed apart to unfold. Also at the same time a third hydraulic cylinder 74 unfolds rear leg 46. The process of raising and folding support tracks 42 and legs 44, 46 is the reverse of the process just described. The hydraulic cylinders are duplicated for each support track 42. Flexible hydraulic lines (not shown) lead to the usual hydraulic pump and control system, which forms no part of the invention and therefore is not further described herein. Limit switches (not illustrated) can be used to automatically stop the relative movement of the aft section 16 relative to the forward section 14.

It should be understood also that the side walls 28 of the aft section 16 are offset so as to bypass in spaced relation the insides of side walls 20 of the forward section 20. All shoulders, horizontal and vertical are fitted with resilient seals (not illustrated) which abut similar seals on the shoulders of the corresponding forward section members to provide weatherproofing in extended or retracted positions. A scraper is also provided to clean the underside of aft section 16 while being retracted. The seals and scrapers also do not form part of the invention and will not be described further.

Figure 11:
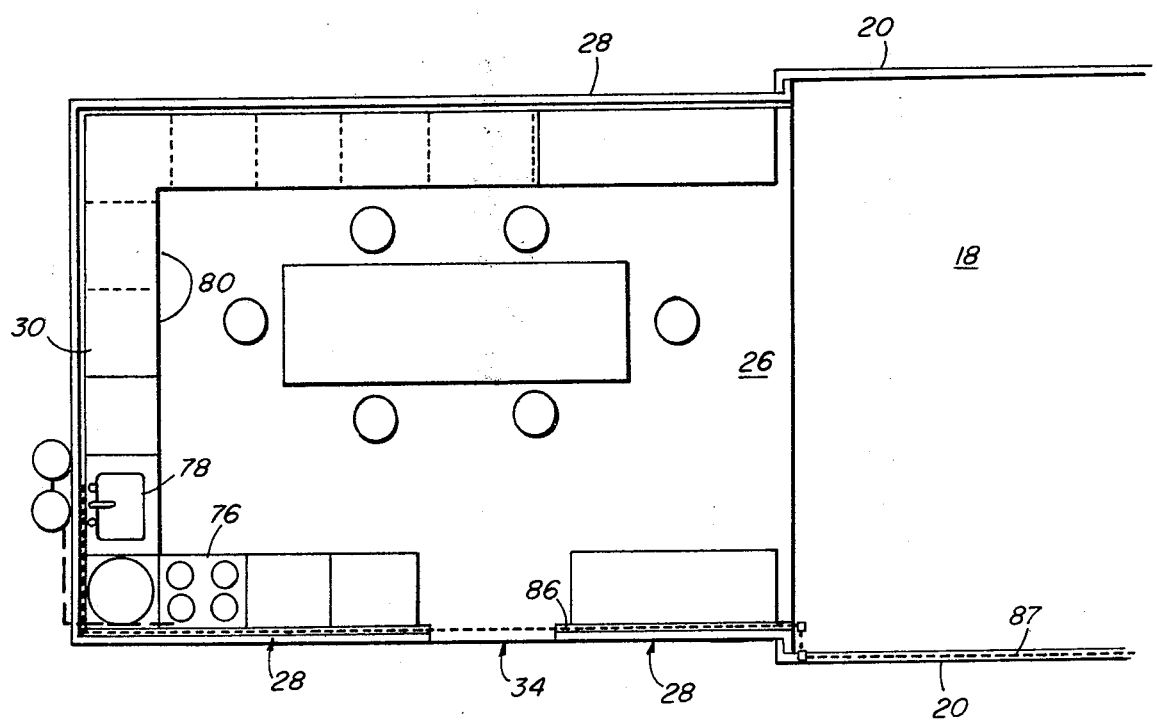
FIG. 11 is a floor plan of the camper body of FIG. 2 with the aft section extended.

FIG. 11 is a floor plan of the expandable camper body 12 of this invention. This plan shows all kitchen areas such as sink 78, stove 76 and cabinets 80 located in aft section 16. A shower and toilet (not shown) are located in forward section 14. All gas, electric and water utility lines 86, 87 are enclosed in sidewall 28 of aft section 16, and sidewall 20 of forward section 14. When aft section 16 is fully extended, quick release connections (not shown) connect utility lines 86 at the front end of sidewall 26 to utility lines 87 at the rear end of forward sections 14. When aft section 16 is retracted, these quick release connections are disconnected and reconnected to the prime utility sources of van 10.

FIG. 10 is a partially cut-away view of the floor 26 of aft section 16 showing the relative position of wheels 62 and gear rack 58.

In summary, expandable camper body 12 is designed to overcome many problems encountered in prior art expandable designs. The utilization of folding support tracks provides mechanical simplicity and structural rigidity in a very cost-effective embodiment. The simplified gear rack and spur gear provide a simple, efficient and safe means for extension and retraction of the aft section of the camper body. The design of the preferred embodiment enables the camper body to be utilized whether extended or retracted. It should be noted that the principles of the present invention could also be utilized for an expandable camper body or house trailer which expands horizontally along the latitudinal axis of the camper or trailer. However, in such an embodiment, additional support tracks and perhaps an additional motorized spur gear and gear rack might be required. In any event, the cost effectiveness of such an embodiment would be unfavorable compared with the preferred embodiment described and illustrated herein. In contrast to the prior art, the present invention in its preferred embodiment is designed to maintain favorable weight and balance moments for the aft section when expanded.

While the preferred embodiment has been discussed in detail, various modes of carrying out the invention are contemplated as being within the scope of the following claims, particularly pointing out and distinctly claiming the subject matter which is regarded as the invention.

I claim:

1. An expandable camper body for mounting on a truck chassis comprising:
   a forward fixed section including a roof, two spaced parallel side walls, a floor and a front wall, said forward section being mounted on a truck chassis;
   an aft section including a roof, two spaced parallel side walls, a floor and a rear wall, said aft section being movable in and out with respect to said forward section in telescoping fashion;
   a support and guide mechanism to guide and support said aft section as it is extended from and retracted into said forward section;

said guide and support mechanism further comprising:
- a pair of spaced apart, parallel longitudinal rectangular depressions forming tracks recessed in the floor of said forward section;
- a pair of spaced apart support and guide tracks extending rearward from said van chassis, each of said support tracks having a longitudinal rectangular depression forming a longitudinal extension of said tracks in said forward section;
- at least two vertical adjustable legs for each of said support and guide tracks;
- horizontal support braces positioned between said support and guide tracks to maintain proper track alignment;
- a plurality of wheels mounted on the underside of said aft section to ride in said recessed tracks in said forward section and in said support and guide tracks;
- drive means to move said aft section along said depressed tracks to extend and retract said aft section;
- said drive means further comprising:
- a gear rack mounted on the underside of said aft section;
- a spur gear mounted at the rear of said van chassis which engages said gear rack;
- an electrical motor to drive said spur gear.

2. The expandable camper body of claim 1 wherein each of said support and guide tracks further comprises: two equal sections, the front end of said first section being hinged to the chassis of said van so that it may bold upwards against the rear wall of said aft section it its retracted position;
- said two sections being hinged together at the middle of said support track such that said second section folds downward against said first section when said first section is raised;
- a first vertical support leg positioned under said middle hinge and having two diagonal braces one extending to each of said sections;
- said first vertical support leg pivotally mounted such that it can fold under said first section, and having an opening therein such that said diagonal braces may be folded thereinto;
- a second vertical leg pivotally mounted to rear of said second section such that it can fold under said second section.

3. The expandable camper body of claim 2 further including:
- a first dual action hydraulic cylinder to raise and lower said said first support track section mounted at the rear of said van chassis;
- a second dual action hydraulic cylinder to fold and unfold said
- first and second support track sections, by raising and positioning said diagonal braced, mounted at the base of said first vertical leg;
- a third dual action hydraulic cylinder to raise and lower said second vertical leg.

* * * * *